April 23, 1968 J. S. ARD 3,379,093
RADIATION SAMPLE CELLS
Filed June 10, 1964 2 Sheets-Sheet 1

INVENTOR
JESSE S. ARD

BY
R. Hoffman
ATTORNEY

United States Patent Office 3,379,093
Patented Apr. 23, 1968

3,379,093
RADIATION SAMPLE CELLS
Jesse S. Ard, Glenside, Pa., assignor to the United States of America as represented by the Secretary of Agriculture
Filed June 10, 1964, Ser. No. 374,216
2 Claims. (Cl. 88—14)

ABSTRACT OF THE DISCLOSURE

Radiation sample cells in which a layer of silver is deposited on a non-metallic window and then bonded to a supporting element with low melting solder. The cells do not have to be dismantled to align, grind, or polish the windows; these operations can be performed by warming the soldered bond until it is pliable and making the necessary adjustments.

A non-exclusive, irrevocable, royalty-free license in the invention herein described, throughout the world for all purposes of the United States Government, with the power to grant sublicenses for such purposes, is hereby granted to the Government of the United States of America.

This invention relates to a device which is useful for determining the radiation absorbed by a material. More particularly this invention relates to novel cells for use in spectroscopy, especially infrared spectroscopy, with macro to ultramicro quantities of the material.

In conventional absorption cells, such as those typically used in infrared analysis instruments, the windows of rock salt or other appropriate material are held in place by retaining rings, plates, etc., usually with relatively soft washers interposed between the metal and the window. Many types of cells have so many component parts that the complete device is heavy and bulky. In the simpler devices the windows are typically mounted at a fixed distance by means of a shim-type spacer, which also serves to seal the sample region. Sealing materials, pose the problem of the presence of foreign materials in the cell chamber. In the foregoing cells, and even in those in which tapered windows are fitted into conical, machined mountings, the retaining rings exert pressure perpendicular to the plane of the face of the window. Uneven pressure at the edges can crack the window.

There is an especial need for cells for analyzers utilizing radiation in which very thin cell depths of the order of 0.003 to 0.03 mm. may be obtained yet provide advantages such as cell closure in which these depths are reproducible, uniform distribution of sample with exclusion of air pockets, and simple construction so that filling and cleaning are relatively easy.

An object of the present invention is to provide a cell of relatively simple construction. Another object is to provide a cell in which the windows are supported from the edges, that is, parallel to the plane of the face of the window. A further object is to provide cells in which the sample being analyzed contacts only the cell windows. Still another object is to locate the seals (which function at cell closure) in a zone across a void from the sample. Further objects and a fuller understanding of the invention may be obtained by referring to the following description and claims taken together with the accompanying drawings in which FIG. 1 is a top view of the upper body member of the embodiment of the present invention further illustrated in FIG. 2;

In accordance with the present invention the novel cell comprises an upper body member, a window-supporting element projecting generally centrally from the body member to define a site of lesser area than the inner boundary of said body member, a radiation-transparent window at said site, means of bonding said window to said supporting member, said bonding originating on the edge forming the circumference of said window and extending from the edge to the supporting element in a plane generally parallel to the plane of the face of said window, a matching lower body member and radiation-transparent window assembly, means of aligning the window faces parallel to each other and at a fixed distance apart when the upper and lower body members are joined, and means of removably securing the upper body member and lower body member as a unit.

Figure 1:
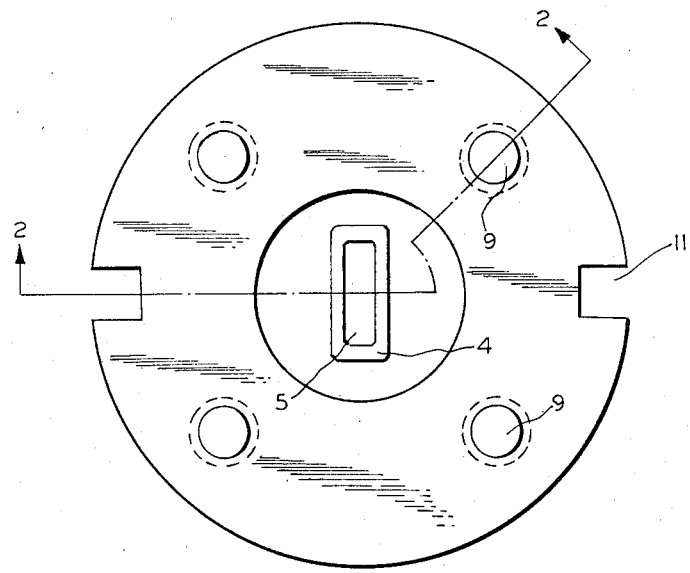
Figure 2:
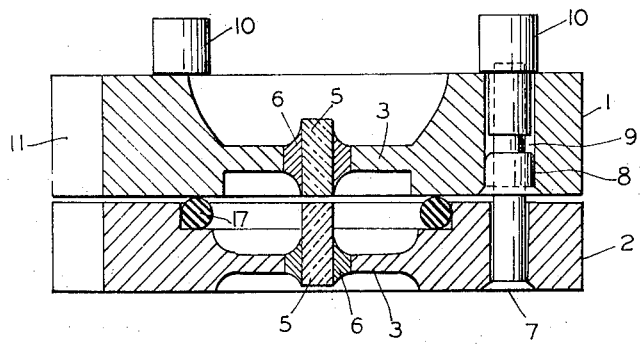
FIG. 2 is a sectional view along line 2—2 of FIG. 1 of an assembled absorption cell.

A typical embodiment of an ultramicro cell of the present invention comprises the assembly illustrated in FIG. 1 and FIG. 2. The upper body member 1 and the lower body member 2 may be generally cylindrical in shape, and, although this shape is not an essential feature, it is an advantage in machining the window-supporting element 3 of this particular type cell. A generally rectangular site 4 is provided in supporting element 3 for positioning the window 5.

The means of bonding the window 5 to the supporting element 3, shown as 6 in the drawings, is the subject of my copending application entitled "Soldering Nonmetals to Metals," Ser. No. 374,215, filed June 10, 1964. Briefly, the process comprises depositing a paste of silver and silver fluoride on the edges of the salt window, heating to convert the reaction product, silver subfluoride, to a layer of metallic silver, tinning the inner perimeter of the support 3, positioning the window 5 in the site 4 and joining the adjacent metallic surfaces with a soft, low-melting solder 6.

As will be readily apparent from FIGURE 2, the solder 6 contacts only the surfaces of windows 5 which are parallel to the axis of the cell; but not the radiation transmitting faces, which are transverse to this axis.

The cell is conveniently assembled in reversibly fixed position by means of bolts or screws. As illustrated, a screw 7 is held in the lower body member 2 by a threaded retaining ring 8, the upper body member 1, provided with appropriately positioned holes 9, is centered on the lower body member and secured with caps 10. The notches or channels 11 are optional but in the working model were provided to engage cell supports in the instrument in which the cell was used.

In the cell illustrated in FIG. 1 and FIG. 2 the grinding, polishing and alignment of the windows and adjustment of depth between windows is accomplished by heating the soft solder 6 until it is pliable, then moving the window vertically with respect to the supporting element.

Figure 3:
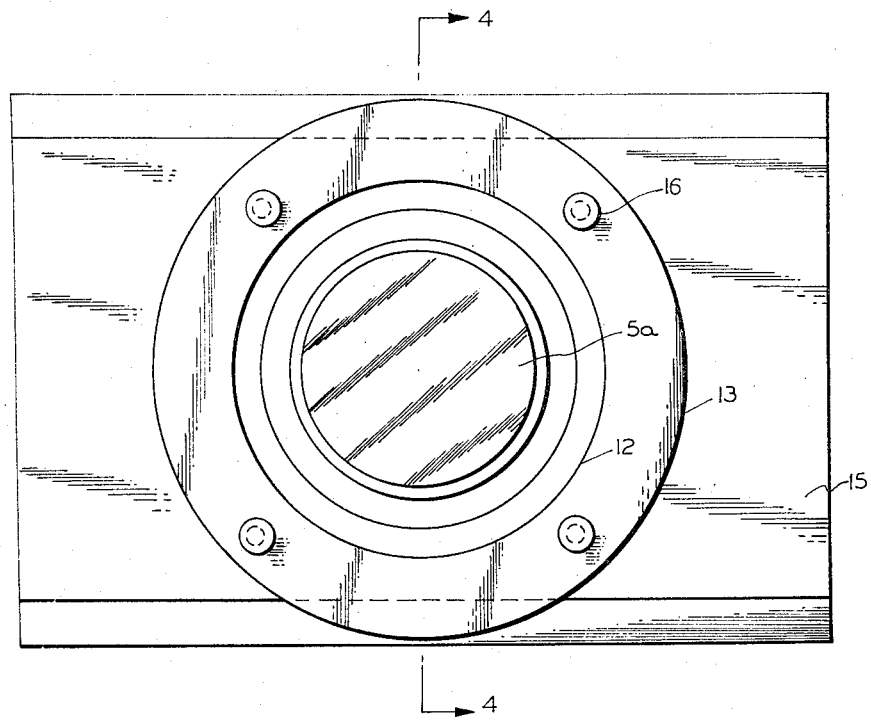
FIG. 3 is a top view of another embodiment of the present invention.
Figure 4:
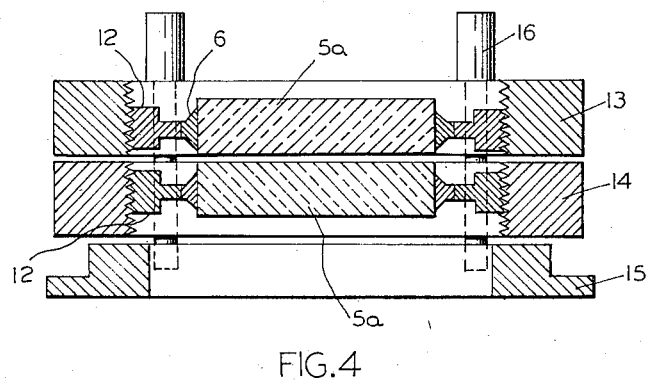
FIG. 4 is a sectional view along line 4—4 of FIG. 3.

In another embodiment of the present invention, as illustrated in FIG. 3 and FIG. 4 the windows 5a are bonded by means of soft solder 6, the same as shown in FIGURE 2, to supporting elements 12 which are threaded collars which turn, as with a spanner key, inside cylindrical frames or body members 13–14. As seen from FIGURE 4, the solder 6 contacts only the peripheral surfaces of windows 5a which are parallel to the axis of the cell; but not the radiation-transmitting faces, which are transverse to this axis. The opposing body member 14 may be substantially identical with 13 as shown, and both 13 and 14 secured by screws 16 to plate 15 adapted for holding the cell in the analytical instrument, or plate 15 may be eliminated and member 13 secured directly to member 14.

In the embodiment of FIG. 4 depths of sample area are easily set as desired by inserting a disc of foil of known thickness in the sample space and turning the threaded collars so that the windows abut the disc. Means of locking the collars in the body members may be provided if desired, as by a set screw (not shown) in the body member to press a soft plug, such as plastic material (also not shown), against the threads of supporting elements 12.

A particularly important advantage of a cell of this design is that by rotating the collar in the frame the windows may be made to project slightly, the window resurfaced with the frame as a guide, then the collar reversibly rotated as desired. The result is a window with an unusual degree of flatness and substantially perfect parallel alignment.

With soldered construction the cells of the present invention have been designed so that the peripheral edges of the windows do not need confining means with liquid samples and mulls.

The sample may be introduced in various ways. The cell may be opened, the sample placed upon one window, the opposing window closed upon the sample with a slight shaking action for equilibrating, and the sample is uniformly distributed by capillary action. Alternatively, the cell may be assembled but not secured, a fine syringe introduced between the body members to the edge of the windows, the sample deposited at the narrow slit and distributed by capillary action; then the syringe removed and the screws tightened. As a modification of the latter a very small opening (not shown) may be provided for introducing a micro syringe to the assembled cell.

The concentration or dilution effect due to volatility of the solvent or of the sample material has been considered. The meeting of the ground surfaces of the body member acts as a partial seal. Sealing zones are made, as illustrated in FIG. 2, with an O-ring 17 contacting the surface of both body members adjacent to the window area. Alternatively, the ground opposing surfaces of the body members as between 1 and 2 or 13 and 14 can be wet with a viscous sealant (not shown).

Previously, some have considered that cells should hold the sample in a dished-out cavity. Capillary pull is strongest at the thin edges, however, and tends to withdraw sample material from the deeper center. In the cells of the present invention this disadvantage has been obviated by employing two parallel window faces projecting towards each other at a distance (depth) of capillary thickness, that is, up to about 0.2 mm. In the present cells the sample seeks to occupy the exact shape of the window faces regardless of means of introducing the sample.

Various sizes and modifications of the cells illustrated in the accompanying drawings have been prepared. Referring to FIG. 1 and FIG. 2, in one specific embodiment the outside diameter of the body members was about 25 mm. (1 inch), tapering to a window supporting element 3 about 9 mm. in diameter and 1 mm. thick. In the site 4, 3 mm. by 6.5 mm., was bonded a sodium chloride window 1.5 mm. wide, 5 mm. long and 4 mm. in thickness. The lower body member 2 was recessed to receive the O-ring 17 (0.07 x 0.5 inch). The window faces were polished and then adjusted to give an assembled cell depth of 0.01 mm. This cell transmitted 40% of an ordinary spectrophotometer beam and was used to obtain a full page infrared spectra with only $\frac{1}{13,000}$ ml. sample. This cell has been used to obtain spectra from liquids, mulls and films.

It will be obvious that cells may be designed according to the present invention to contain windows of various sizes. One of the most successful and popular cells of the type illustrated in FIG. 3 and FIG. 4 has windows of $6\frac{1}{64}$-inch diameter.

In another modification, not illustrated, an ultramicro cell similar in design to that of FIG. 1 and FIG. 2, using less than $\frac{1}{20,000}$ ml. sample was adapted for enclosure in sealed cover plates.

As heretofore indicated the cell depth may be varied over a considerable range. Usually the cells are used with cell depth (sample thickness) of about 0.005 to 0.04 mm., but the cells are considered useful at somewhat lesser depths and at greater depths up to the limit of retention of the sample by capillary attraction, about 0.2 mm. with moderate-sized windows.

The particular means employed to secure the cell in the assembled position is considered immaterial to the invention, but screws with long handled caps 10, 16 are preferred, allowing the cell to be tightened with the fingers and facilitating holding the assembled cell.

The windows may be those employed for infrared spectra such as sodium chloride, potassium bromide, and cesium halides or those which are water-compatible and transmit in the far infrared.

An alternative method of bonding the window to the window supporting element makes possible the use of window material such as thallium bromoiodide having a melting point too low for the silver plating reaction. A soft metal band, such as a lead or tin band, is rolled over a layer of silver-filled epoxy resin which has been deposited on the edge of the window. Excess epoxy is wiped away, and, after the cement has hardened the band is soldered to the supporting element with low-melting solder.

The cells of the present invention have many advantages; take-apart accessibility to surface areas, especially the window surfaces for cleaning and resurfacing; window choices ranging from common salt to water-compatible and far-infrared materials; O-ring-tight static sealing; substantially automatic and wasteless distribution of sample by the plateau-window principle for capillary thicknesses; prevention of intensity stunting by effortless shielding; elimination of spacers and need for clamping, drilling or grooving fragile windows; and easy recovery of sample. Miniaturization is possible, with spectra of normal intensity attainable without beam condensation or electrical expansion with samples of less than $\frac{1}{20,000}$ ml. The thinness attainable with liquid and film depths tends to eliminate media complications, dead drifts, and informationless intensity excesses.

The embodiments of the apparatus of the present invention are presented by way of illustration only. It will be understood that various modifications of the apparatus may be made without departing from the principles and scope of the invention which is not limited to the embodiments herein above described and illustrated by way of example and which is defined by the appended claims.

I claim:

1. A cell for an analyzer utilizing radiation comprising:
    (a) an upper body member having an inner boundary and an outer boundary, said upper body member defining an axis of the cell along which the radiation is transmitted;
    (b) a window-supporting element projecting generally centrally from the inner boundary of said upper body member to define a site of lesser area than the inner boundary of said upper body member;
    (c) a first-radiation-transparent window within said site having an area smaller than that of said site and so positioned to transmit radiation axially of said cell;
    (d) means for rigidly suspending the first window within the site of lesser area defined by said supporting member, said means comprising bonding means originating on the edge forming the circumference of the first window and extending from said edge to said supporting element in a plane generally parallel to the plane of the face of the first window, said bonding means contacting only that portion of the first window parallel to the axis of the cell and constituting the sole connection between the first window and the supporting element;

(e) a matching lower body member having a second radiation transparent window supported in the manner similar to and aligned with said first window;
(f) means for aligning the window faces parallel to each other and at a fixed distance apart when the upper and lower body members are joined; and
(g) means for removably securing said upper and lower body member as a cell unit.

2. A cell in accordance with claim 1 wherein each window-supporting element comprises a separate threaded collar rotatable within the respective body members.

References Cited
UNITED STATES PATENTS

| | | | |
|---|---|---|---|
| 1,918,958 | 7/1933 | Colina | 88—14 |
| 2,819,402 | 1/1958 | Watson et al. | 88—14 X |

FOREIGN PATENTS 667,896  3/1952  Great Britain.

JEWELL H. PEDERSEN, *Primary Examiner.*

C. E. QUARTON, O. B. CHEW, *Assistant Examiners.*